(12) United States Patent
Lo et al.

(10) Patent No.: US 11,843,555 B2
(45) Date of Patent: Dec. 12, 2023

(54) DEVICE AND METHOD FOR HANDLING REFERENCE SIGNALS IN AN UNLICENSED BAND

(71) Applicant: ACER INCORPORATED, New Taipei (TW)

(72) Inventors: Li-Chung Lo, New Taipei (TW); Chien-Min Lee, New Taipei (TW); Jen-Hsien Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 87 days.

(21) Appl. No.: 17/170,719

(22) Filed: Feb. 8, 2021

(65) Prior Publication Data

US 2021/0297213 A1  Sep. 23, 2021

Related U.S. Application Data

(60) Provisional application No. 62/991,597, filed on Mar. 19, 2020.

(51) Int. Cl.
| | |
|---|---|
| *H04B 7/06* | (2006.01) |
| *H04L 5/00* | (2006.01) |
| *H04W 74/08* | (2009.01) |
| *H04W 24/10* | (2009.01) |

(52) U.S. Cl.
CPC ......... *H04L 5/0048* (2013.01); *H04B 7/0632* (2013.01); *H04W 24/10* (2013.01); *H04W 74/0808* (2013.01); *H04W 74/0833* (2013.01)

(58) Field of Classification Search
CPC ... H04L 5/0048; H04L 5/0023; H04L 5/0091; H04L 27/0006; H04B 7/0632; H04B 7/0695; H04B 7/0602; H04B 17/309; H04B 7/088; H04B 1/0075; H04W 24/10; H04W 74/0808; H04W 74/0833; H04W 16/28; H04W 76/19; H04W 24/04; H04W 24/08; H04W 16/14; H04W 74/006; H04W 76/18; H04W 28/0268
See application file for complete search history.

(56) References Cited

U.S. PATENT DOCUMENTS

| | | | |
|---|---|---|---|
| 2020/0229157 A1* | 7/2020 | Rastegardoost | .... H04W 72/042 |
| 2021/0194756 A1* | 6/2021 | Babaei | ................ H04L 41/0654 |

FOREIGN PATENT DOCUMENTS

| | | | | |
|---|---|---|---|---|
| EP | 2 916 581 A1 | 9/2015 | | |
| EP | 3799330 A1 * | 3/2021 | ........... | H04B 7/0695 |
| JP | 2020-504967 A | 2/2020 | | |

(Continued)

OTHER PUBLICATIONS

LG Electronics Inc., RLM/RLF enhancements in NR-U, 3GPP TSG-RAN2 Meeting #106, R2-1908008, May 13-17, 2019, pp. 1-5, Reno, USA, XP051712256.

*Primary Examiner* — Thai Nguyen
(74) *Attorney, Agent, or Firm* — Winston Hsu

(57) ABSTRACT

A communication device for handling a reference signal (RS) in an unlicensed band comprises at least one storage device; and at least one processing circuit, coupled to the at least one storage device. The at least one storage device stores instructions, and the at least one processing circuit is configured to execute the instructions of: receiving a RS from a network; updating a counter, if a quality of the RS is smaller than a measurement threshold value; and restarting a RS timer, when receiving the RS.

32 Claims, 18 Drawing Sheets

(56) References Cited

FOREIGN PATENT DOCUMENTS

| WO | 2019/195465 A1 | 10/2019 | | |
|----|----|----|----|----|
| WO | 2019/246084 A1 | 12/2019 | | |
| WO | 2020/033726 A1 | 2/2020 | | |
| WO | 2020/045920 A1 | 3/2020 | | |
| WO | 2020/083388 A1 | 4/2020 | | |
| WO | WO-2021090248 A1 * | 5/2021 | ........... | H04L 5/0053 |
| WO | WO-2021163404 A1 * | 8/2021 | | |

* cited by examiner

| Length of a COT interval (ms) | Trigger offset (slot/symbol/ms) | Periodicity of at least one RS (slot) |
|---|---|---|
| $A_{COT} \leq A_0$ | $B_0$ | $C_0$ |
| $A_1 < A_{COT} \leq A_1$ | $B_1$ | $C_1$ |
| $A_1 < A_{COT} \leq A_2$ | $B_2$ | $C_2$ |

FIG. 9

| Field included in DL information | Trigger offset (slot/symbol/ms) | Periodicity of at least one RS (slot) |
|---|---|---|
| 00 | none | none |
| 01 | $B_1$ | $C_1$ |
| 10 | $B_2$ | $C_2$ |
| 11 | $B_3$ | $C_3$ |

DEVICE AND METHOD FOR HANDLING REFERENCE SIGNALS IN AN UNLICENSED BAND

CROSS REFERENCE TO RELATED APPLICATIONS

This application claims the benefit of U.S. Provisional Application No. 62/991,597 filed on Mar. 19, 2020, which is incorporated herein by reference.

BACKGROUND OF THE INVENTION

1. Field of the Invention

The present invention relates to a device and a method used in a wireless communication system, and more particularly, to a device and a method of handling reference signals in an unlicensed band.

2. Description of the Prior Art

A long-term evolution (LTE) system supporting the 3rd Generation Partnership Project (3GPP) Rel-8 standard and/ or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

When operating in a licensed band, the UE receives reference signals (RSs) periodically from the eNB, and performs communication operations according to the RSs. When operating in an unlicensed band, the UE may only receive the RSs in a channel occupancy time (COT) interval, i.e., the UE is not able to receive the RSs periodically. The UE cannot perform the communication operations accurately due to an uncertain RS transmission. Thus, how to process the RSs in the unlicensed band is an important problem to be solved.

SUMMARY OF THE INVENTION

The present invention therefore provides a device and a method for handling a sounding reference signal (SRS) transmission to solve the abovementioned problem.

A communication device for handling a reference signal (RS) in an unlicensed band comprises at least one storage device; and at least one processing circuit, coupled to the at least one storage device, wherein the at least one storage device stores instructions. The at least one processing circuit is configured to execute the instructions of: receiving a RS from a network; updating a counter, if a quality of the RS is smaller than a measurement threshold value; and restarting a RS timer, when receiving the RS.

A communication device for handling a reference signal (RS) in an unlicensed band comprises at least one storage device; and at least one processing circuit, coupled to the at least one storage device, wherein the at least one storage device stores instructions. The at least one processing circuit is configured to execute the instructions of: receiving a RS from a network; updating a counter, if a quality of the RS is smaller than a first measurement threshold value; and initiating a procedure with the network, when the counter is greater than a threshold value.

A communication device for handling reference signal (RSs) in an unlicensed band comprises at least one storage device; and at least one processing circuit, coupled to the at least one storage device, wherein the at least one storage device stores instructions. The at least one processing circuit is configured to execute the instructions of: receiving downlink (DL) information from a network; determining at least one RS parameter according to the DL information; and receiving at least one RS from the network according to the at least one RS parameter.

A communication device for handling a reference signal (RS) in an unlicensed band comprises at least one storage device; and at least one processing circuit, coupled to the at least one storage device, wherein the at least one storage device stores instructions. The at least one processing circuit is configured to execute the instructions of: restarting a quality timer and updating a counter, if the communication device receives a RS from a network in a first channel occupancy time (COT) interval and a quality of the RS is smaller than a measurement threshold value; and starting a pause timer and pausing the quality timer, after the first COT interval, or when the RS is not received after the first COT interval, or when the RS is a last RS in the first COT interval.

A communication device for handling a reference signal (RS) in an unlicensed band comprises at least one storage device; and at least one processing circuit, coupled to the at least one storage device, wherein the at least one storage device stores instructions. The at least one processing circuit is configured to execute the instructions of: restarting a quality timer and updating a counter, if the communication device receives a RS from a network in a first channel occupancy time (COT) interval and a quality of the RS is smaller than a measurement threshold value; and pausing the quality timer, after the first COT interval, or when the RS is not received after the first COT interval, or when the RS is a last RS in the first COT interval.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a table of RS parameters according to an example of the present invention.

DETAILED DESCRIPTION

Figure 1:
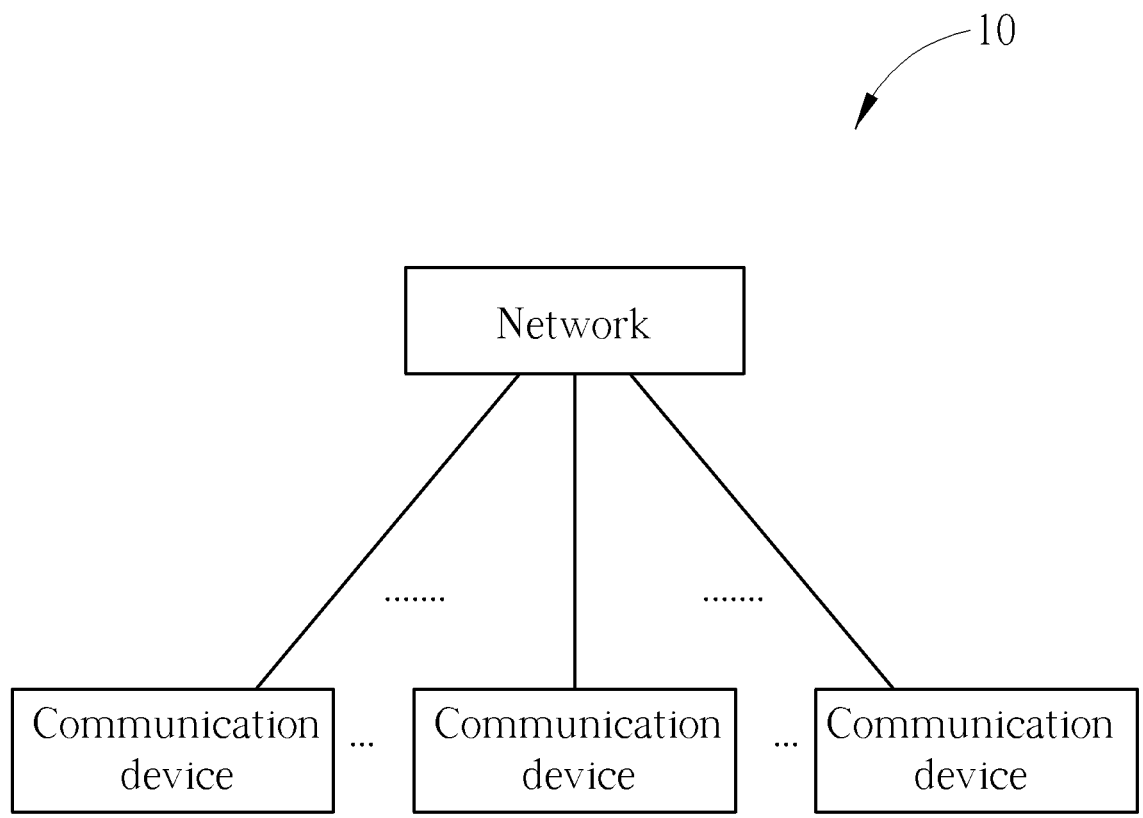
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)) In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
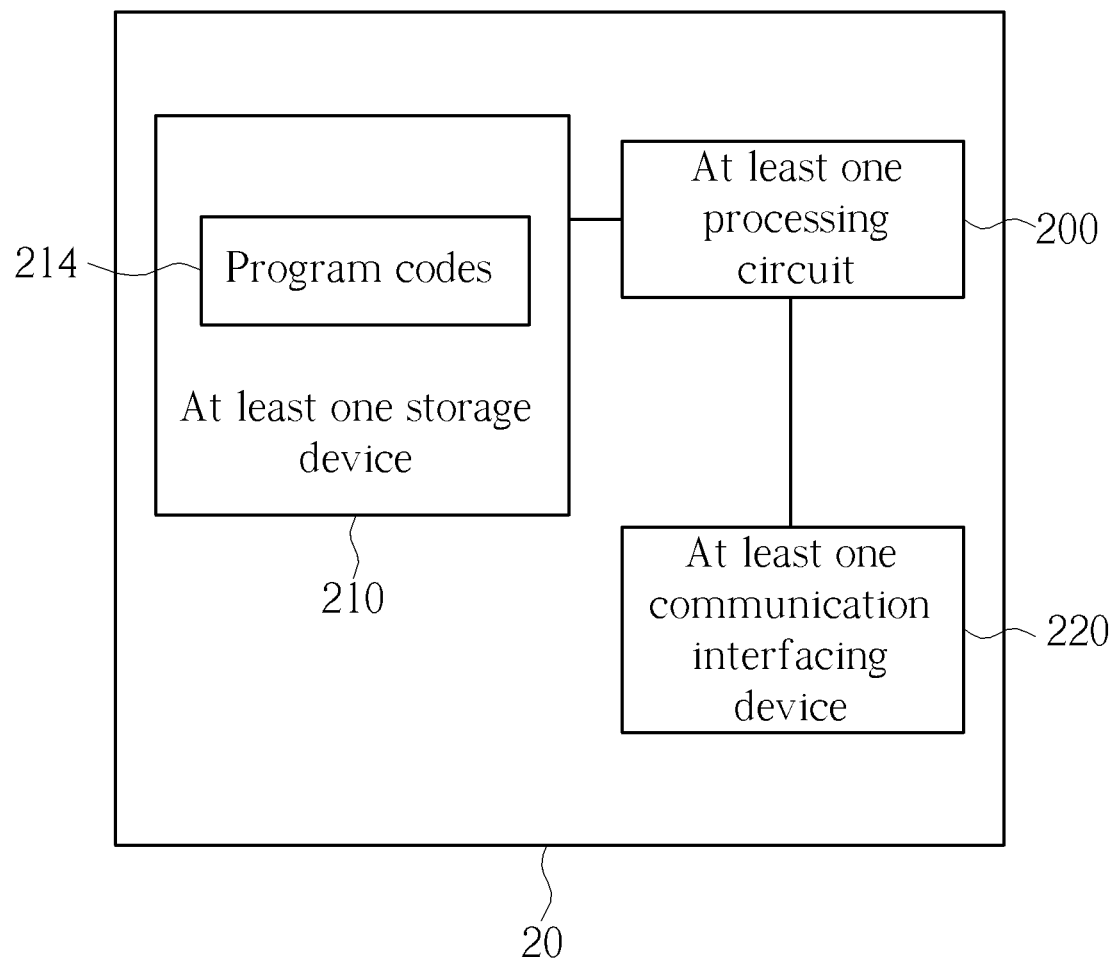
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
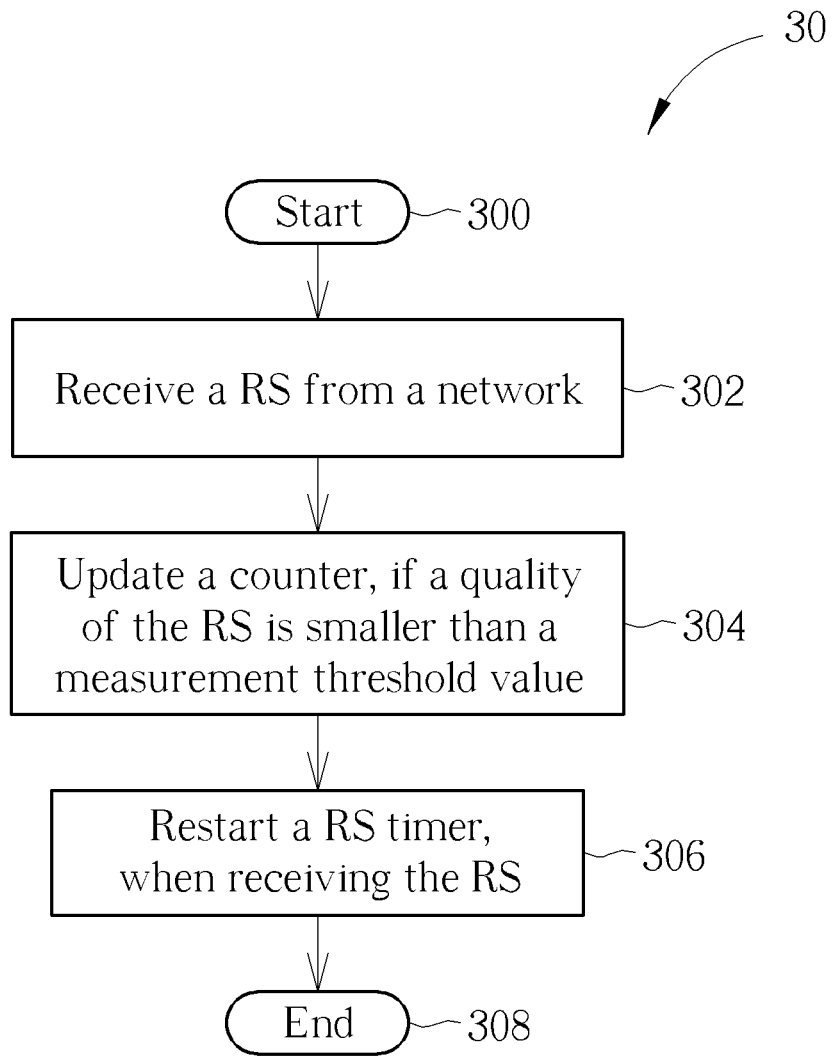
FIG. 3 is a flowchart of a process according to an example of the present invention.

FIG. 3 is a flowchart of a process 30 according to an example of the present invention. The process 30 may be utilized in a communication device, to handle reference signal (RSs). The process 30 may be compiled into the program codes 214 and includes the following steps:

Step 300: Start.
Step 302: Receive a RS from a network.
Step 304: Update a counter, if a quality of the RS is smaller than a measurement threshold value.
Step 306: Restart a RS timer, when receiving the RS.
Step 308: End.

According to the process 30, the communication device receives (e.g., monitors) a RS (e.g., a beam failure detection (BFD) RS or a radio link monitoring (RLM) RS) from a network (e.g., in an unlicensed band). The communication device may perform a measurement according to the RS, to obtain a quality of the RS. The communication device updates a counter, if the quality of the RS is smaller than a measurement threshold value. The counter is for counting a number of received RSs with qualities smaller than the measurement threshold value (e.g., a number of beam failure instances (BFIs)). The communication device restarts (e.g., starts) a RS timer, when receiving the RS. Thus, the communication device may operate properly according to the RS timer in the unlicensed band, even if the communication device cannot receive the RSs periodically.

In one example, the network performs a listen before talk (LBT) procedure in the unlicensed band, to reserve a channel occupancy time (COT) interval for the communication device. In one example, the communication device receives DL information (e.g., DL control information (DCI)) from the network, and receives the RS according to the DL information. In one example, the DL information is a DCI, and the DCI comprises COT information for the unlicensed band. In one example, the communication device receives the RS in a COT interval or in a channel occupancy duration. That is, the communication device may receive the DCI including the COT information in the COT interval or in a channel occupancy duration, if the LBT procedure succeeds. The communication device may determine the COT interval according to the DCI, and receives the RSs in the COT interval.

In one example, the RS and a physical UL control channel (PUCCH) are associated with a same transmission configuration indication (TCI) state. That is, the communication device may receive the RS and the PUCCH via beams with the same direction. In one example, the communication device receives the RS according to a search space set. That is, the communication device may determine a COT interval according to a change of search space sets, and receives the RSs in the COT interval. For example, the communication device may determine a COT interval according to a change from a search space set with group index "1" to a search space set with group index "0". Thus, the communication device may perform different monitoring operations according to different search space sets in different time intervals.

In one example, the communication device initiates a procedure with the network, when the counter is greater than a threshold value, or when the RS timer expires. That is, the communication device initiates the procedure according to both the counter and the RS timer. In one example, the RS is a BFD RS. In one example, the procedure comprises at least one of a random access (RA) procedure, a selection of a new candidate beam or a transmission of a PUCCH (e.g., a SR-like PUCCH) for a beam failure recovery (BFR). That is, the communication device may perform a BFD procedure (e.g., the process 30) according to receptions of the RSs (e.g., the BFD RSs) in the unlicensed band, in response to a real beam state.

In one example, the RS is a RLMRS. In one example, the procedure comprises at least one of a declaration of a radio link problem or a recovery procedure of physical layer problems. For example, the communication device may start a timer (e.g., T310) and/or a counter (e.g., N311), when the RS timer expires. That is, the communication device may perform a radio problem detection procedure (e.g., the process 30) according to receptions of the RSs (e.g., the RLM RSs) in the unlicensed band, to detect a radio link problem.

In one example, the communication device is configured with a value of the RS timer, a countdown step for the RS timer and a countdown period for the RS timer. That is, the communication device may decrease the value of the RS timer according to the countdown step, after the countdown period.

In one example, the communication device determines a value of the RS timer according to the counter and restarts the RS timer according to the value, when receiving the RS. That is, the communication device may start or restart the RS timer with different values according to the counter.

Figure 4:
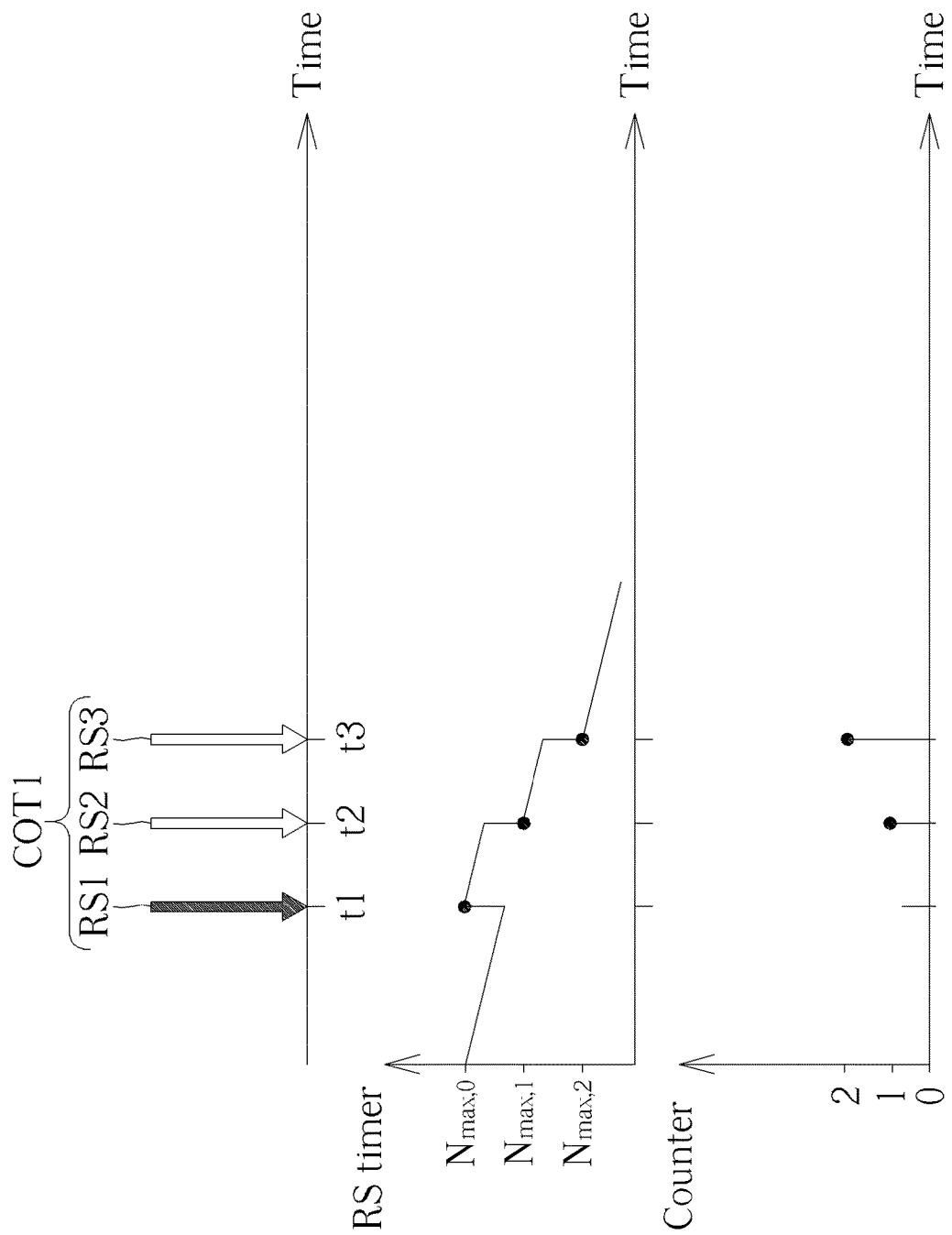
FIG. 4 is a schematic diagram of a value adjustment for a RS timer according to an example of the present invention.

FIG. 4 is a schematic diagram of a value adjustment for a RS timer according to an example of the present invention. The communication device may be scheduled to receive RSs RS1-RS3 from the network in an unlicensed band, and restarts (e.g., starts) a RS timer at times instants t1-t3, respectively. The times instants t1-t3 are in a COT interval COT1. A RS represented by a solid arrow (e.g., the RS RS1) means that a quality of the RS is greater than a measurement threshold value. A RS represented by a hollow arrow (e.g., the RSs RS2 and RS3) means that a quality of the RS is smaller than the measurement threshold value. The communication device updates a counter, when receiving the RS represented by the hollow arrow. In the present example, the communication device is configured with values $N_{max,0}$, $N_{max,1}$ and $N_{max,2}$ for starting (e.g., restarting) the RS timer. For example, the communication device receives the RS RS2, and updates the counter to 1. The communication device restarts the RS timer with the value $N_{max,1}$, when the counter is 1.

In one example, the communication device determines a value of the RS timer according to the counter and an offset, and restarts the RS timer according to the value when receiving the RS. That is, the communication device may start or restart the RS timer with different values according to the counter and the offset. According to FIG. 4, the communication device may be configured with the value $N_{max,0}$, and may determine the values $N_{max,1}$ and $N_{max,2}$ according to the counter and the offset. For example, the communication device may determine that $N_{max,1}=N_{max,0}-1*N_{offset}$, when the counter is 1, wherein $N_{offset}$ represents the offset. The communication device may determine that $N_{max,2}=N_{max,0}-2*N_{offset}$, when the counter is 2.

In one example, the communication device restarts (e.g., starts) a quality timer, if the quality of the RS is smaller than the measurement threshold value, and resets the counter when the quality timer expires. That is, the communication device may reset the counter to 0, when the quality timer expires.

Figure 5A:
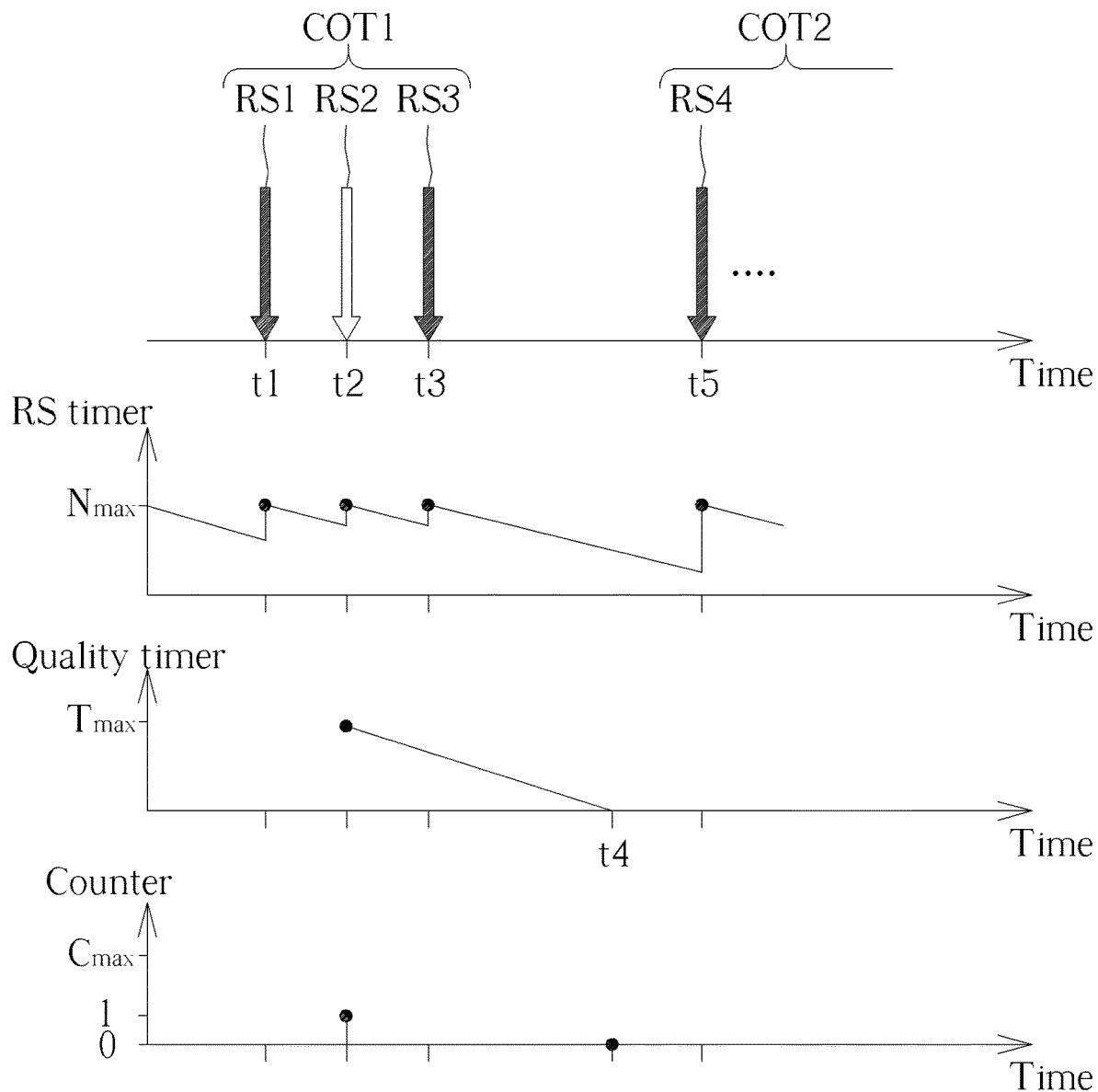
FIGS. 5A-5B are schematic diagrams of receptions of RSs according to an example of the present invention.
Figure 5B:
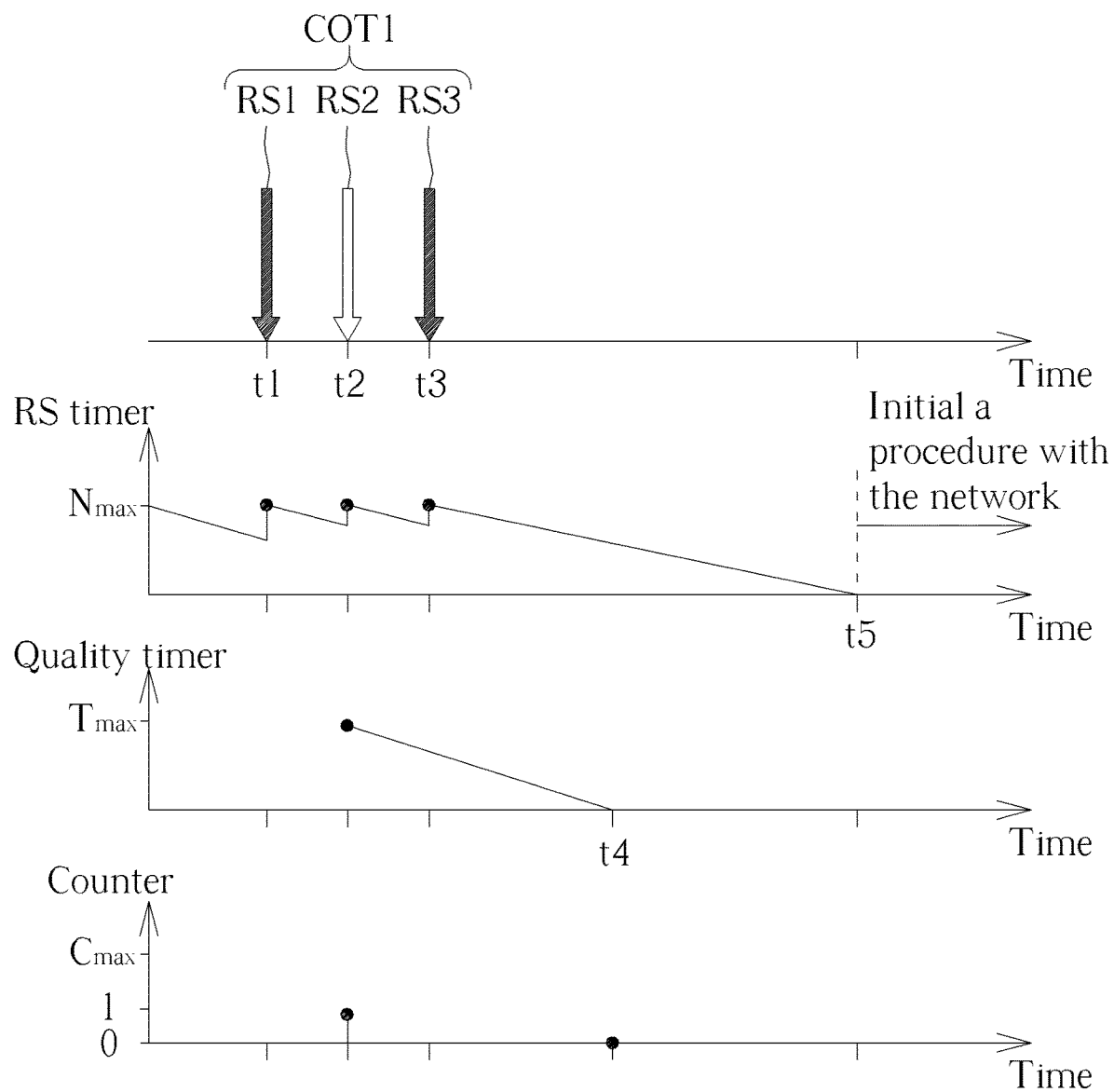

FIGS. 5A-5B are schematic diagrams of receptions of RSs according to an example of the present invention. There are two cases for illustrating operations of a RS timer, a quality timer and a counter in different conditions. The RS timer, the quality timer and the counter may be a new timer, a BFD timer and a BFI counter, respectively, e.g., if the RSs are BFD RSs. The communication device may be configured with values $N_{max}$, $T_{max}$ and $C_{max}$ by a higher layer signal. The communication device starts (e.g., restarts) the RS timer with the value $N_{max}$, and starts (e.g., restarts) the quality timer with the value $T_{max}$. The value $C_{max}$ is a maximum value (e.g., the threshold value) of a number of received RSs with qualities smaller than a measurement threshold value. The communication device may initiate a procedure with the network, when the counter is equal to the value $C_{max}$.

In FIGS. 5A-5B, the communication device receives RSs RS1-RS3 from the network in an unlicensed band, and restarts the RS timer at times instants t1-t3, respectively. The times instants t1-t3 are in a COT interval COT1. A RS represented by a solid arrow (e.g., the RSs RS1 and RS3) means that a quality of the RS is greater than the measurement threshold value. ARS represented by a hollow arrow (e.g., the RS RS2) means that a quality of the RS is smaller than the measurement threshold value. At the time instant t2 (i.e., when receiving the RS RS2), the communication device starts the quality timer, and updates the counter. At the time instant t4, the quality timer expires, and the communication device resets the counter.

In FIG. 5A, at a time instant t5, the communication device receives a RS RS4 from the network in the unlicensed band, and restarts the RS timer. The time instant t5 is in a COT interval COT2. That is, the communication device receives the RS RS4 before the RS timer expires. The communication device may continue monitoring RSs in the unlicensed band. In FIG. 5B, the RS timer expires at a time instant t5. That is, the communication device may initiate the procedure with the network due to an expiry of the RS timer.

In one example, the communication device may transmit an indication to higher layers (e.g., a media access control (MAC) layer and/or a radio resource control (RRC) layer), when receiving a RS. The communication device may start (or restart) a RS timer, when receiving the indication from lower layers (e.g., a physical layer and/or the MAC layer).

In one example, the communication device may transmit a first indication (e.g., a BFI indication) to higher layers (e.g., a MAC layer and/or a RRC layer), when receiving a first RS with a quality smaller than the measurement threshold. The communication device may transmit a second indication (e.g., a new indication) to the higher layers (e.g., the MAC layer and/or the RRC layer), when receiving a second RS with a quality greater than the measurement threshold. The communication device may start (or restart) a RS timer, when receiving the first indication or the second indication from lower layers (e.g., a physical layer and/or the MAC layer).

Figure 6:
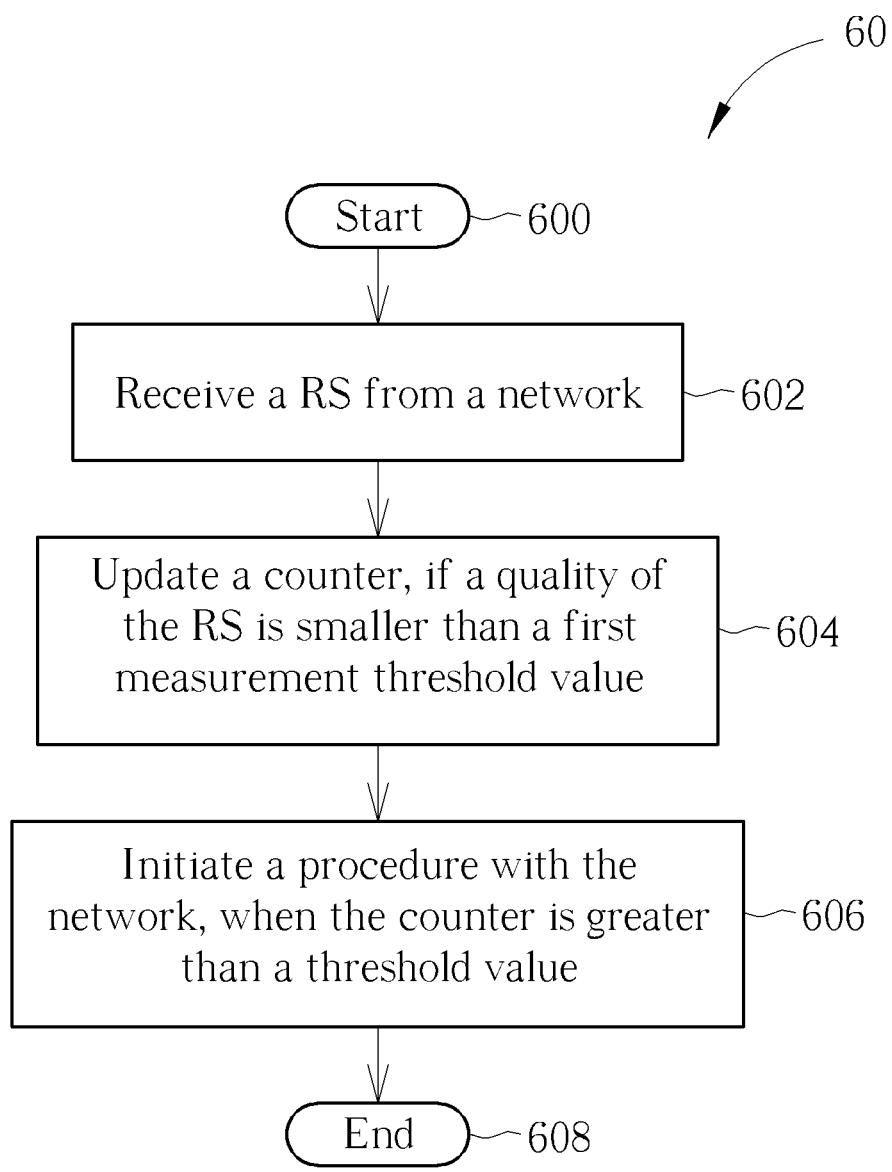
FIG. 6 is a flowchart of a process according to an example of the present invention.

FIG. 6 is a flowchart of a process 60 according to an example of the present invention. The process 60 may be utilized in a communication device, to handle a RS. The process 60 may be compiled into the program codes 214 and includes the following steps:

Step 600: Start.
Step 602: Receive a RS from a network.
Step 604: Update a counter, if a quality of the RS is smaller than a first measurement threshold value.
Step 606: Initiate a procedure with the network, when the counter is greater than a threshold value.
Step 608: End.

According to the process 60, the communication device receives (e.g., monitors) a RS from a network (e.g., in an unlicensed band). The communication device may perform a measurement according to the RS, to obtain a quality of the RS. The communication device updates a counter, if the quality of the RS is smaller than a first measurement threshold value. The counter is for counting a number of received RSs with qualities smaller than the first measurement threshold value. The communication device initiates a procedure with the network, when the counter is greater than a threshold value. That is, the communication device updates the counter according to the RSs. Thus, the communication device may operate properly according to the RSs in the unlicensed band in response to a real beam state, even if the communication device cannot receive the RSs periodically.

In one example, the RS and a beam failure detection (BFD) RS are associated to a same reference RS (e.g., a quasi co-location (QCL) assumption). That is, the communication device may receive the BFD RS and the RS via beams with the same direction.

In one example, the communication device receives the BFD RS according to a search space set. That is, the communication device may determine a COT interval according to a change of search space sets, and receives the BFD RSs in the COT interval. For example, the communication device may determine a COT interval according to a change from a search space set with group index "1" to a search space set with group index "0". Thus, the communication device may perform different monitoring operations for the BFD RSs according to different search space sets in different time intervals.

In one example, the communication device receives DL information (e.g., DCI) from the network in the unlicensed band, and receives the BFD RS according to the DL information. In one example, the DL information is a DCI, and the DCI comprises COT information (e.g., for the unlicensed band). That is, the communication device may determine a COT interval according to the DCI, and receives the BFD RSs in the COT interval. In one example, the communication device receives the BFD RS in a COT interval for the BFD RS, and receives the RS in a transmission window for the RS. That is, the communication device may receive (e.g., monitor) the RS outside the COT interval, to perform a BFD procedure. In one example, the communication device updates the counter, if a quality of the BFD RS is smaller than a second measurement threshold value.

In one example, the communication device restarts (e.g., starts) a first quality timer, if the quality of the RS is smaller than the first measurement threshold value. The communication device restarts (e.g., starts) a second quality timer, if a quality of the BFD RS is smaller than a second measurement threshold value. The communication device resets the counter (e.g., to 0), when the first quality timer and the second quality timer expire. In one example, the communication device may be configured with values of the first quality timer and the second quality timer by a higher layer signal. In one example, if the values of the first quality timer and the second quality timer are the same, the communication device may only restart (e.g., start) the first quality timer or the second quality timer, to monitor the BFD RSs and/or the DRSs.

In one example, the procedure comprises at least one of a RA procedure, a selection of a new candidate beam or a transmission of a PUCCH for a BFR. In one example, the RS is a discovery RS (DRS). Further, the DRS is a channel status information reference signal (CSI-RS) or a synchronization signal/physical broadcast channel (SS/PBCH) block. In one example, the network may transmit DRS transmission window information to the communication device. In a DRS transmission window, the communication device may know candidate positions of DRSs (e.g., synchronization signal blocks (SSBs)) and a periodicity of beam directions for the DRSs according to the DRS transmission window information, and may assume a QCL relation between the DRSs in DRS transmission windows. The network may transmit the DRSs to the communication device via beams with different directions in a DRS transmission window (e.g., in a bandwidth part (BWP)), after performing a LBT procedure successfully.

Figure 7A:
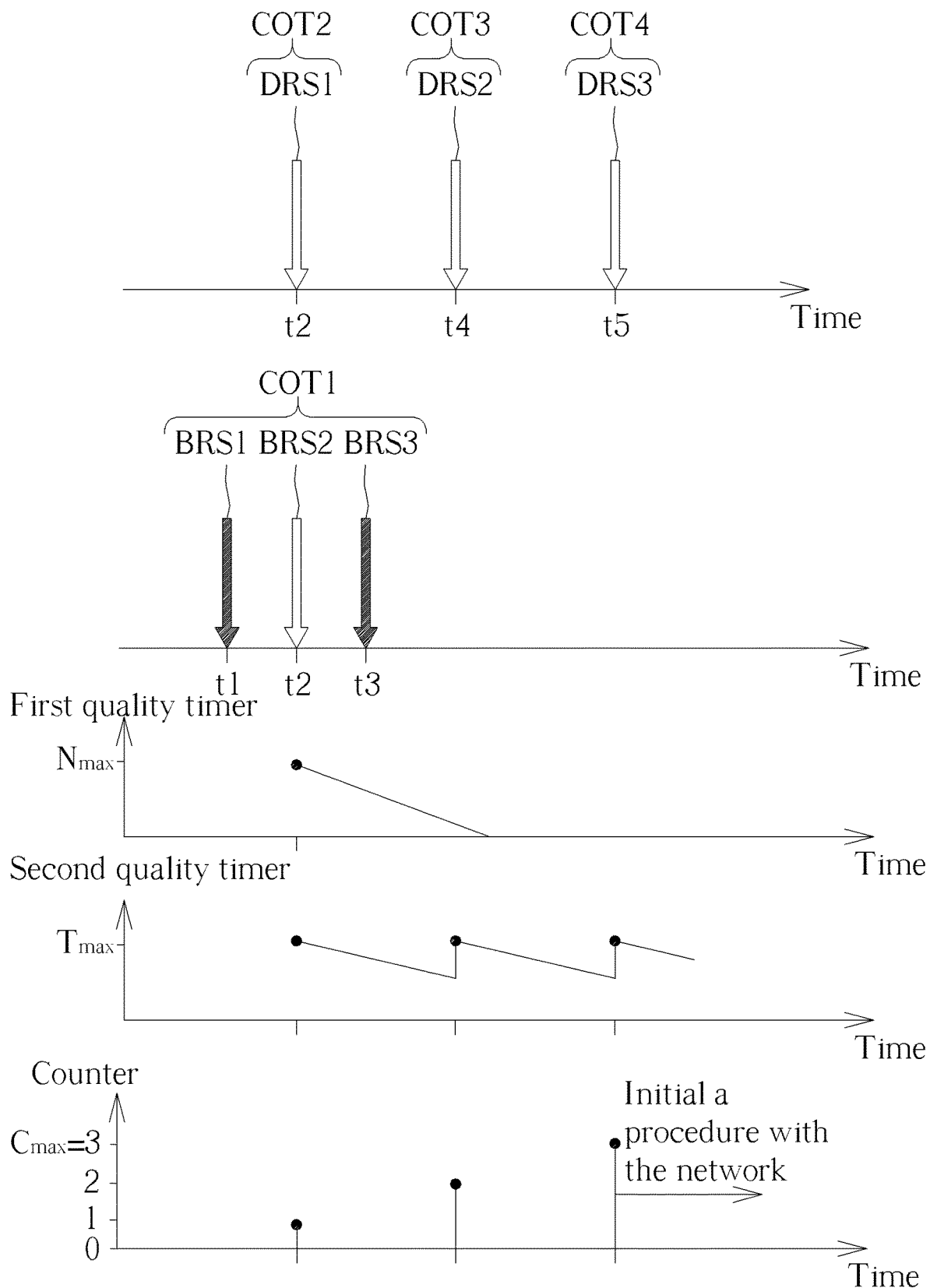
FIGS. 7A-7C are schematic diagrams of receptions of RSs according to an example of the present invention.
Figure 7B:
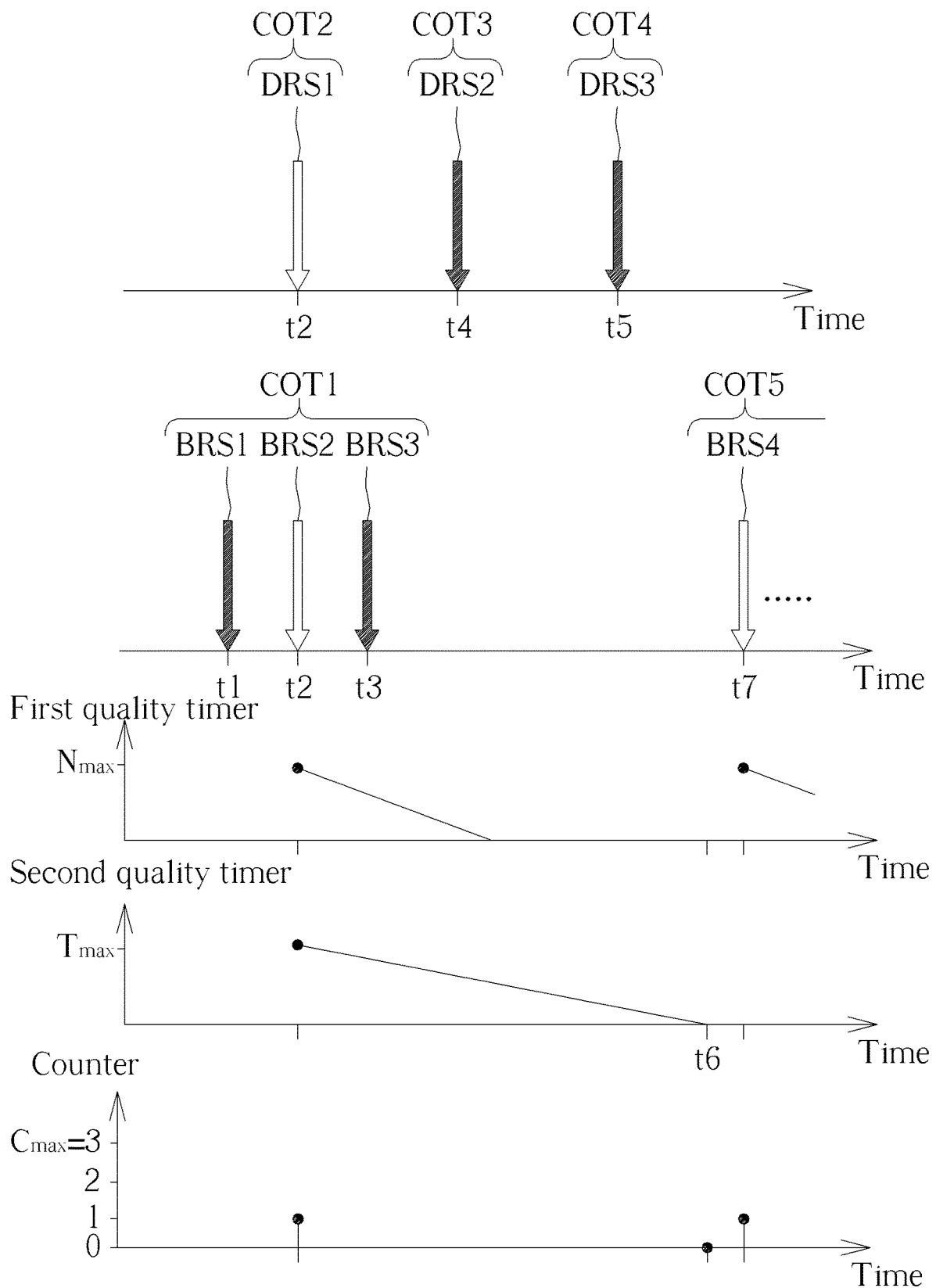
Figure 7C:
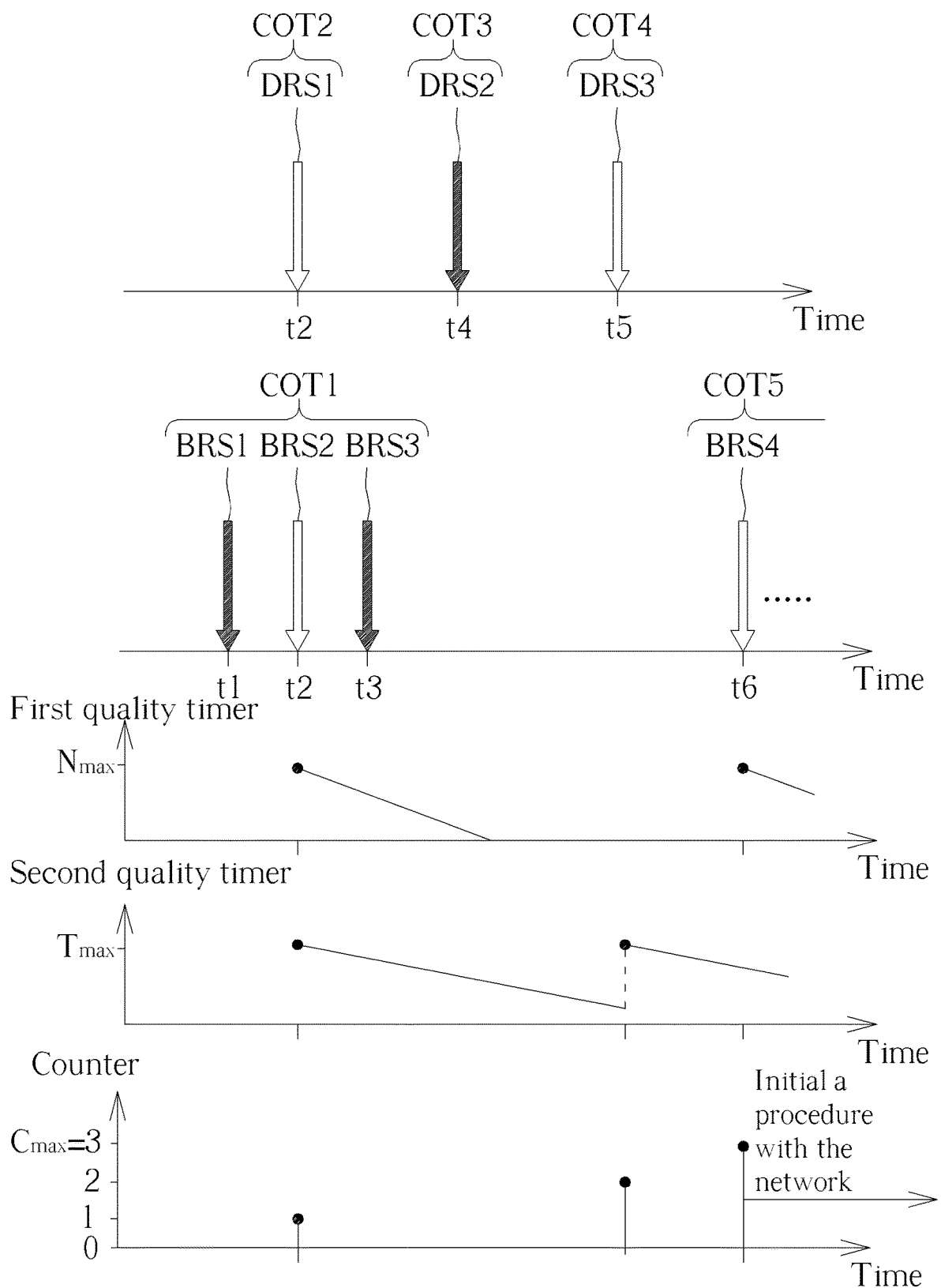

FIGS. 7A-7C are schematic diagrams of receptions of RSs according to an example of the present invention. There are three cases for illustrating operations of a first quality timer, a second quality timer and a counter in different conditions. The operations may be utilized for a BFD procedure, e.g., if the RSs are BFD RSs. The communication device may be configured with values $N_{max}$, $T_{max}$ and $C_{max}$ by a higher layer signal. The communication device starts (e.g., restarts) the first quality timer with the value $N_{max}$, and starts (e.g., restarts) the second quality timer with the value $T_{max}$. The value $C_{max}$ is a maximum value (e.g., the threshold value) of the counter. In FIGS. 7A-7C, the communication device receives BFD RSs BRS1-BRS3 from the network in an unlicensed band at times instants t1-t3, respectively. The times instants t1-t3 are in a COT interval COT1. A RS represented by a solid arrow (e.g., the BFD RSs BRS1 and BRS3) means that a quality of the RS is greater than a measurement threshold value (e.g., the first measurement threshold value and the second measurement threshold value). A RS represented by a hollow arrow (e.g., the BFD RS BRS2) means that a quality of the RS is smaller than the measurement threshold value. At the time instant t2, the communication device starts the quality timer, and updates the counter. In addition, the communication device receives DRSs DRS1-DRS3 from the network in the unlicensed band at times instants t2, t4 and t5, respectively. The times instants t2, t4 and t5 are in COT intervals COT2-COT4, respectively.

In FIG. 7A, qualities of the DRSs DRS2 and DRS3 are smaller than the measurement threshold value. At the times instants t4 and t5, the communication device restarts the second quality timer, and updates the counter. That is, the communication device may initiate a procedure with the network according to the counter equal to the value $C_{max}$. In FIG. 7B, the qualities of the DRSs DRS2 and DRS3 are greater than the measurement threshold value. At a time instant t6, the second quality timer expires after the second quality timer expires, and the communication device resets the counter to 0. At a time instant t7, the communication device receives a BFD RS BRS4, starts the first quality timer, and updates the counter, wherein the time instant t7 is in a COT interval COT5. That is, the communication device may continue monitoring RSs (e.g., other BFD RSs and/or other DRSs) in the unlicensed band. In FIG. 7C, the quality of the DRS DRS3 is smaller than the measurement threshold value. At the time instant t5, the communication device restarts the second quality timer, and updates the counter. At a time instant t6, the communication device receives a BFD RS BRS4, restarts the first quality timer, and updates the counter, wherein the time instant t6 is in a COT interval COT5. That is, the communication device may initiate a procedure with the network according to the counter equal to the value $C_{max}$.

According to FIG. 7, the communication device may be configured with periodicities of the BFD RSs and the DRSs by a higher layer signal, and the periodicities of the BFD RSs and the DRSs may be the same or different.

In one example, the communication device (e.g., a physical layer) may transmit an indication (e.g., a DRS BFI indication) to higher layers (e.g., a MAC layer and/or a RRC layer), when receiving a DRS with a quality smaller than the second measurement threshold value in a COT interval. The communication device may start (e.g., restart) the second quality timer, when receiving the indication, and the COT interval for the DRS is overlapped with a COT interval for BFD RSs. The communication device may start (e.g., restart) the second quality timer and may update the counter, when receiving the indication, and the COT interval for the DRS is non-overlapped with the COT interval for the BFD RSs.

In one example, the communication device may transmit a first indication (e.g., a first DRS BFI indication) to higher layers (e.g., a MAC layer and/or a RRC layer), when receiving a first DRS with a quality smaller than the second measurement threshold value in a COT interval overlapped with a COT interval for BFD RSs. The communication device may transmit a second indication (e.g., a second DRS BFI indication) to higher layers (e.g., a MAC layer and/or a RRC layer), when receiving a second DRS with a quality smaller than the second measurement threshold value in a COT interval non-overlapped with the COT interval for the BFD RSs. The communication device may start (e.g., restart) the second quality timer, when receiving the first indication from lower layers (e.g., a physical layer and/or a MAC layer). The communication device may start (e.g., restart) the second quality timer and may update the counter, when receiving the second indication from lower layers (e.g., the physical layer and/or the MAC layer).

Figure 8:
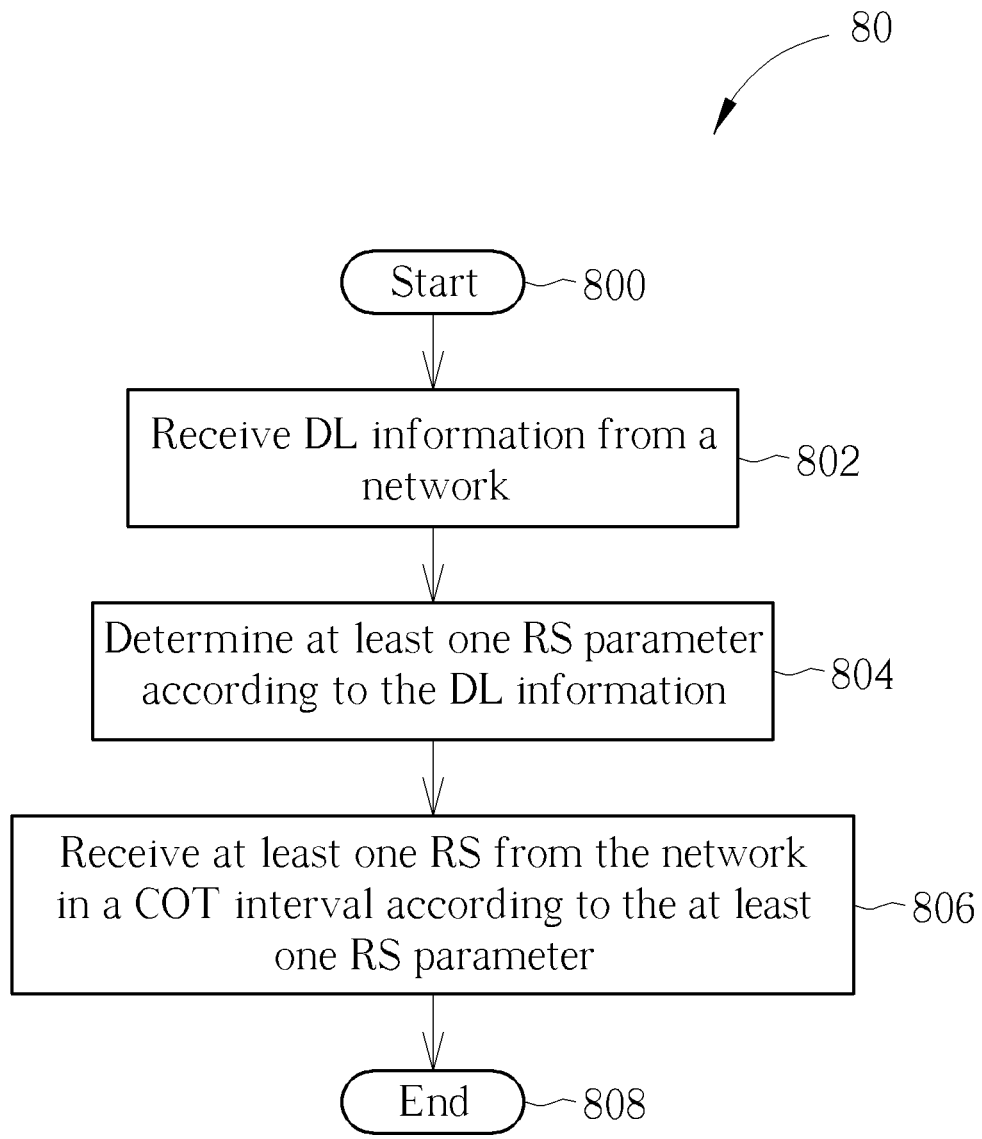
FIG. 8 is a flowchart of a process according to an example of the present invention.

FIG. 8 is a flowchart of a process 80 according to an example of the present invention. The process 80 may be utilized in a communication device, to handle reference signal (RSs). The process 80 may be compiled into the program codes 214 and includes the following steps:

Step 800: Start.
Step 802: Receive DL information from a network.
Step 804: Determine at least one RS parameter according to the DL information.
Step 806: Receive at least one RS from the network according to the at least one RS parameter.
Step 808: End.

According to the process 80, the communication device receives DL information from a network (e.g., in an unlicensed band), and determines at least one RS parameter according to the DL information. The communication device receives at least one RS (e.g., BFD RS) from the network (e.g., in the unlicensed band) according to the at least one RS parameter. Thus, the communication device may operate properly according to the RSs in the unlicensed band, even if the communication device cannot receive the RSs periodically.

In one example, the network performs a LBT procedure in the unlicensed band, to reserve the COT interval for the communication device. The communication device receives the DL information from the network (e.g., in a COT interval), if the LBT procedure succeeds. In one example, the DL information is a DCI.

In one example, the at least one RS parameter comprises at least one of a periodicity of the at least one RS or a trigger offset for the at least one RS. The trigger offset is a time offset between a receiving timing of the DL information and a receiving timing of the at least one RS.

In one example, the DL information comprises a length of a COT interval, and the communication device determines the at least one RS parameter according to the length of the COT interval. That is, a periodicity of the at least one RS and a trigger offset for the at least one RS may be determined according to the length of the COT interval.

FIG. 9 is a table 90 of RS parameters according to an example of the present invention. In the table 90, different lengths of a COT interval $A_{COT}$ represent different trigger offsets and different periodicities of the at least one RS. Threshold values $A_0$, $A_1$, $A_2$, trigger offsets $B_0$, $B_1$, $B_2$ and periodicities $C_0$, $C_1$, $C_2$ of the at least one RS may be preconfigured (e.g., configured) by the network, or may be fixed values. For example, the communication device determines the trigger offset $B_0$ and the periodicity $C_0$, when the length of the COT interval $A_{COT}$ is smaller than or equal to the threshold value $A_0$. For example, the communication device determines the trigger offset $B_1$ and the periodicity $C_1$, when the length of the COT interval $A_{COT}$ is greater than the threshold value $A_0$, and the length of the COT interval $A_{COT}$ is smaller than or equal to the threshold value $A_1$. In one example, the network may transmit a DL signal including the table 90 to the communication device, and may transmit DL information including a length of a COT interval to the communication device. Thus, the communication device knows a trigger offset for the at least one RS and a periodicity of the at least one RS according to the length of the COT interval.

In one example, the DL information comprises a field for the at least one RS parameter. That is, the communication device may determine a periodicity of the at least one RS and a trigger offset for the at least one RS according to the field included in the DL information.

Figure 10:
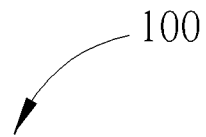
FIG. 10 is a table of RS parameters according to an example of the present invention.

FIG. 10 is a table 100 of RS parameters according to an example of the present invention. In the table 100, different bits in a field represent different trigger offsets and different periodicities of the at least one RS. Trigger offsets $B_0$, $B_1$, $B_2$ and periodicities $C_0$, $C_1$, $C_2$ of the at least one RS may be preconfigured (e.g., configured) by the network, or may be fixed values. For example, bits {00} in the field indicate that there is no trigger offset and no periodicity for the at least one RS. For example, bits {10} in the field indicate the trigger offset $B_2$ and the periodicity $C_2$. In one example, the network may transmit a DL signal including the table 100 to the communication device, and may transmit DL information including the field. Thus, the communication device knows a trigger offset for the at least one RS and a periodicity of the at least one RS according to the field.

In one example, the communication device receives at least one COT-specific RS from the network in a COT interval (e.g., in the unlicensed band). That is, the network may configure the at least one COT-specific RS in slots of the COT interval (e.g., a last slot of the COT interval), such that the communication device may operate properly according to the at least one RS and the at least one COT-specific RS. In one example, the communication device receives the at least one RS from the network in a COT interval. In one example, the communication device may receive another DL information including COT information in the COT interval. Thus, the communication device does not fail to receive the DL information due to miss detection (e.g., in the process 80).

Figure 11:
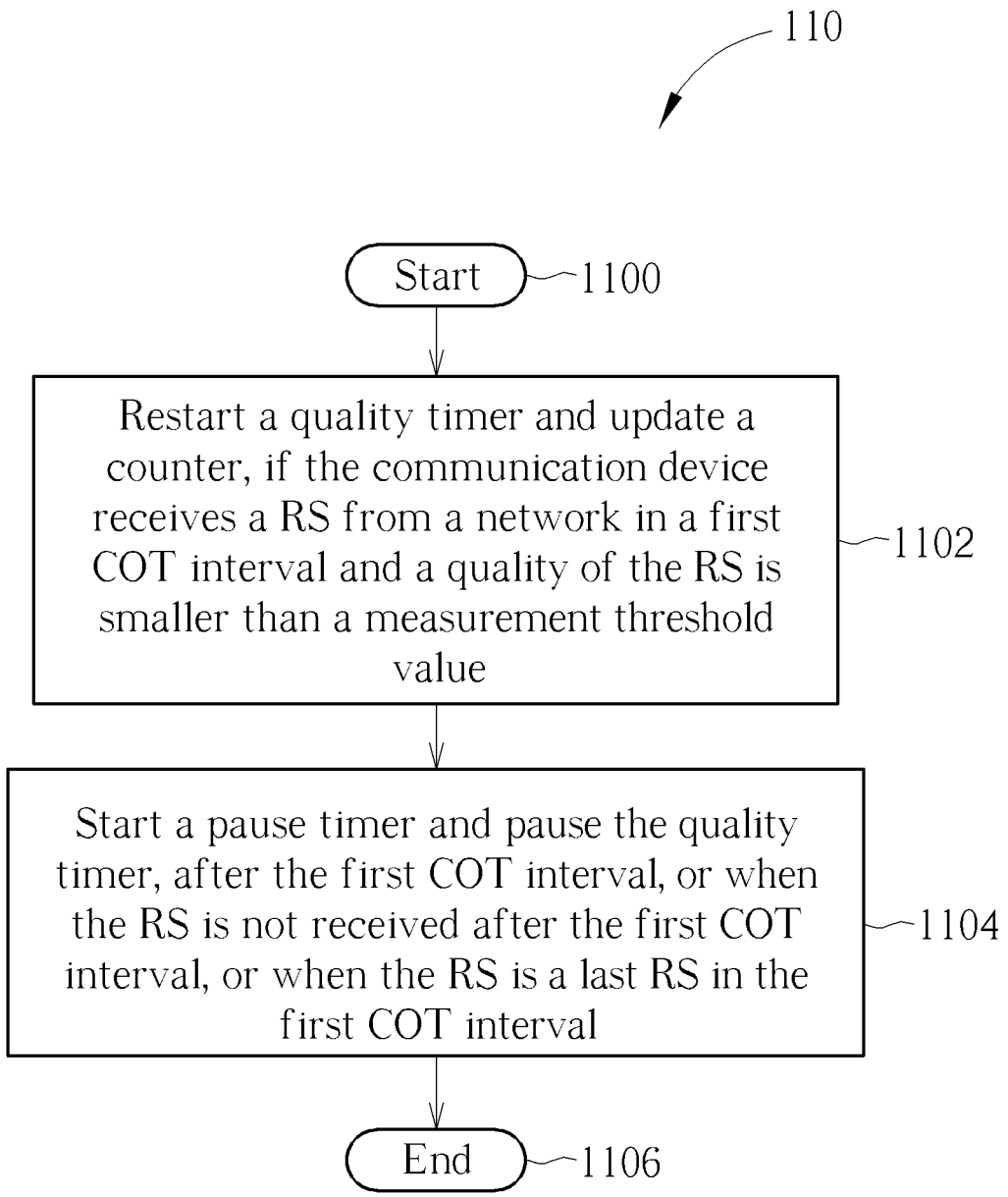
FIG. 11 is a flowchart of a process according to an example of the present invention.

FIG. 11 is a flowchart of a process 110 according to an example of the present invention. The process 110 may be utilized in a communication device, to handle a RS. The process 110 may be compiled into the program codes 214 and includes the following steps:

Step 1100: Start.

Step 1102: Restart a quality timer and update a counter, if the communication device receives a RS from a network in a first COT interval and a quality of the RS is smaller than a measurement threshold value.

Step 1104: Start a pause timer and pause the quality timer, after the first COT interval, or when the RS is not received after the first COT interval, or when the RS is a last RS in the first COT interval.

Step 1106: End.

According to the process 110, the communication device may perform a measurement according to a RS to obtain a quality of the RS, if the communication device receives the RS from a network in a first COT interval. The communication device restarts (e.g., starts) a quality timer (e.g., BFD timer) and updates a counter, if the quality of the RS is smaller than a measurement threshold value. The counter is for counting a number of received RSs with qualities smaller than the measurement threshold value (e.g., a number of BFIs). The communication device starts (e.g., restarts) a pause timer and pauses the quality timer, after the first COT interval, or when the RS is not received after the first COT interval, or when the RS is a last RS in the first COT interval. That is, the quality timer may be extended according to the pause timer. Thus, the communication device may operate properly according to the RSs in the unlicensed band, even if the communication device cannot receive the RSs periodically.

In one example, the communication device stops the pause timer, when receiving the RS from the network in a second COT interval (e.g., in the unlicensed band). In one example, the communication device resumes the quality timer, when the pause timer expires, or when receiving the RS from the network in a second COT interval (e.g., in the unlicensed band).

Figure 12A:
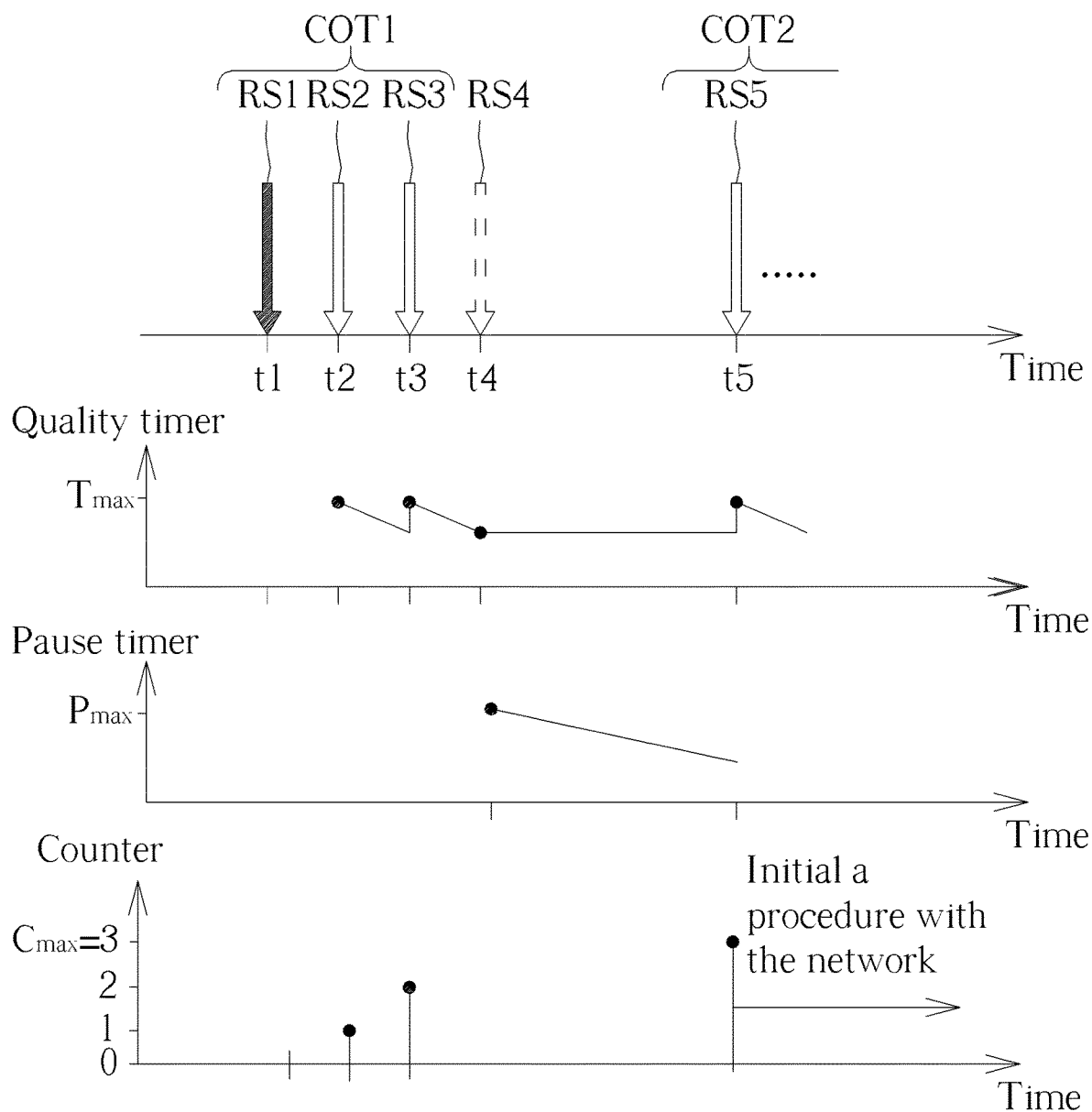
FIGS. 12A-12B are schematic diagrams of receptions of RSs according to an example of the present invention.
Figure 12B:
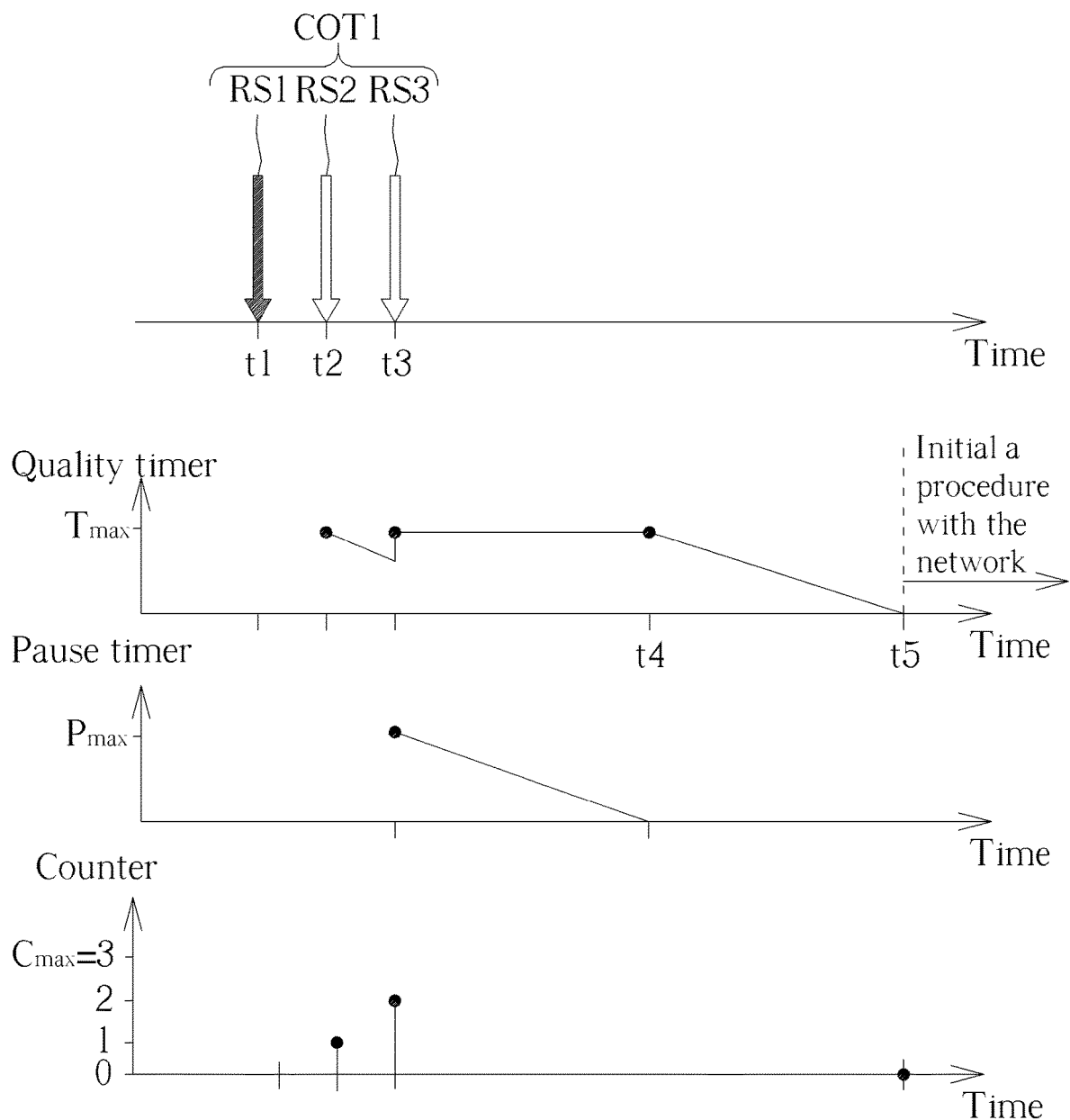

FIGS. 12A-12B are schematic diagrams of receptions of RSs according to an example of the present invention. There are two cases for illustrating operations of a quality timer, a pause timer and a counter in different conditions. The quality timer and the counter may be a BFD timer and a BFI counter, respectively, e.g., if the RSs are BFD RSs. The communication device may be configured with values $T_{max}$, $P_{max}$ and $C_{max}$ by a higher layer signal. The value $C_{max}$ is a maximum value (e.g., the threshold value) of a number of received RSs with qualities smaller than a measurement threshold value. In FIGS. 12A-12B, the communication device receives RSs RS1-RS3 from the network in an unlicensed band at times instants t1-t3, respectively. At the times instants t2 and t3, the communication device restarts (e.g., starts) the quality timer, and updates the counter. The times instants t1-t3 are in a COT interval COT1. A RS represented by a solid arrow (e.g., the RS RS1) means that a quality of the RS is greater than the measurement threshold value. A RS represented by a hollow arrow (e.g., the RSs RS2 and RS3) means that a quality of the RS is smaller than the measurement threshold value.

In FIG. 12A, the communication device may not receive a RS RS4 from the network in the unlicensed band at a time instant t4 (because the time instant t4 is outside the COT interval COT1). At the time instant t4, the communication device pauses the quality timer, and starts the pause timer. Then, at a time instant t5, the communication device receives a RS RS5, restarts the quality timer, and stops the pause timer. The time instant t5 is in a COT interval COT2. That is, the communication device may initiate a procedure with the network according to the counter which is equal to the value $C_m$ax. In FIG. 12B, at a time instant t4, the pause timer expires, and the communication device resumes the quality timer. Then, the quality timer expires at a time instant t5. That is, the communication device may initiate a procedure with the network according to an expiry of the quality timer.

In one example, the communication device may initiate a procedure with the network, when the counter is greater than a threshold value, when the quality timer expires. In one example, the procedure comprises at least one of a RA procedure, a selection of a new candidate beam or a transmission of a PUCCH (e.g., a SR-like PUCCH) for a BFR.

Figure 13:
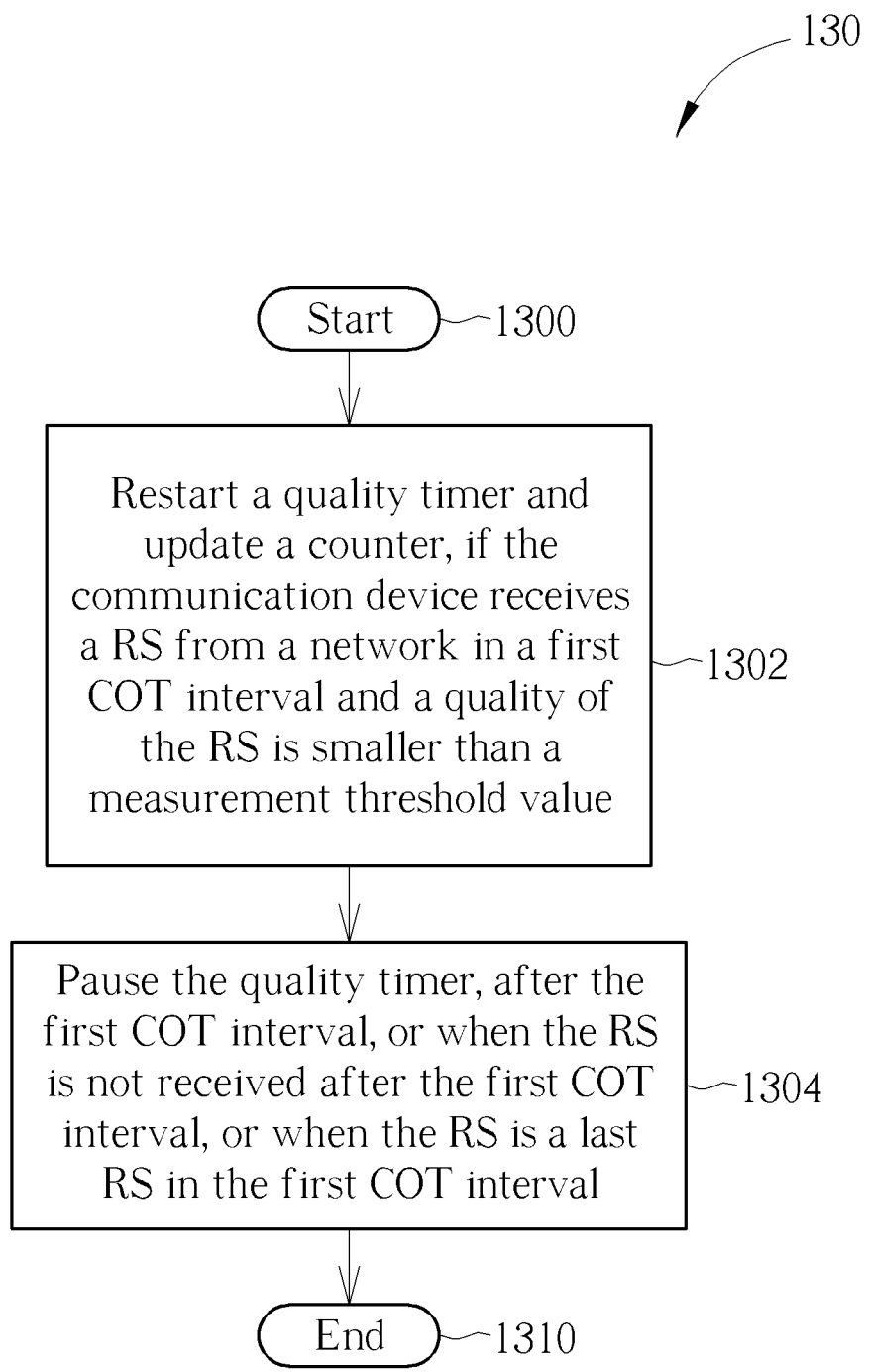
FIG. 13 is a flowchart of a process according to an example of the present invention.

FIG. 13 is a flowchart of a process 110 according to an example of the present invention. The process 110 may be utilized in a communication device, to handle a RS. The process 110 may be compiled into the program codes 214 and includes the following steps:

Step 1300: Start.

Step 1302: Restart a quality timer and update a counter, if the communication device receives a RS from a network in a first COT interval and a quality of the RS is smaller than a measurement threshold value.

Step 1304: Pause the quality timer, after the first COT interval, or when the RS is not received after the first COT interval, or when the RS is a last RS in the first COT interval.

Step 1306: End.

According to the process 130, the communication device may perform a measurement according to a RS, to obtain a quality of the first RS, if the communication device receives the RS from a network in a first COT interval. The communication device restarts (e.g., starts) a quality timer (e.g., BFD timer) and updates a counter, if the quality of the first RS is smaller than a measurement threshold value. The counter is for counting a number of received RSs with qualities smaller than the measurement threshold value (e.g., a number of BFIs). The communication device pauses the quality timer, after the first COT interval, or when the RS is not received after the first COT interval, or when the RS is a last RS in the first COT interval. That is, the quality timer may be extended according to a time interval. Thus, the communication device may operate properly according to the RSs in the unlicensed band, even if the communication device cannot receive the RSs periodically.

Figure 14:
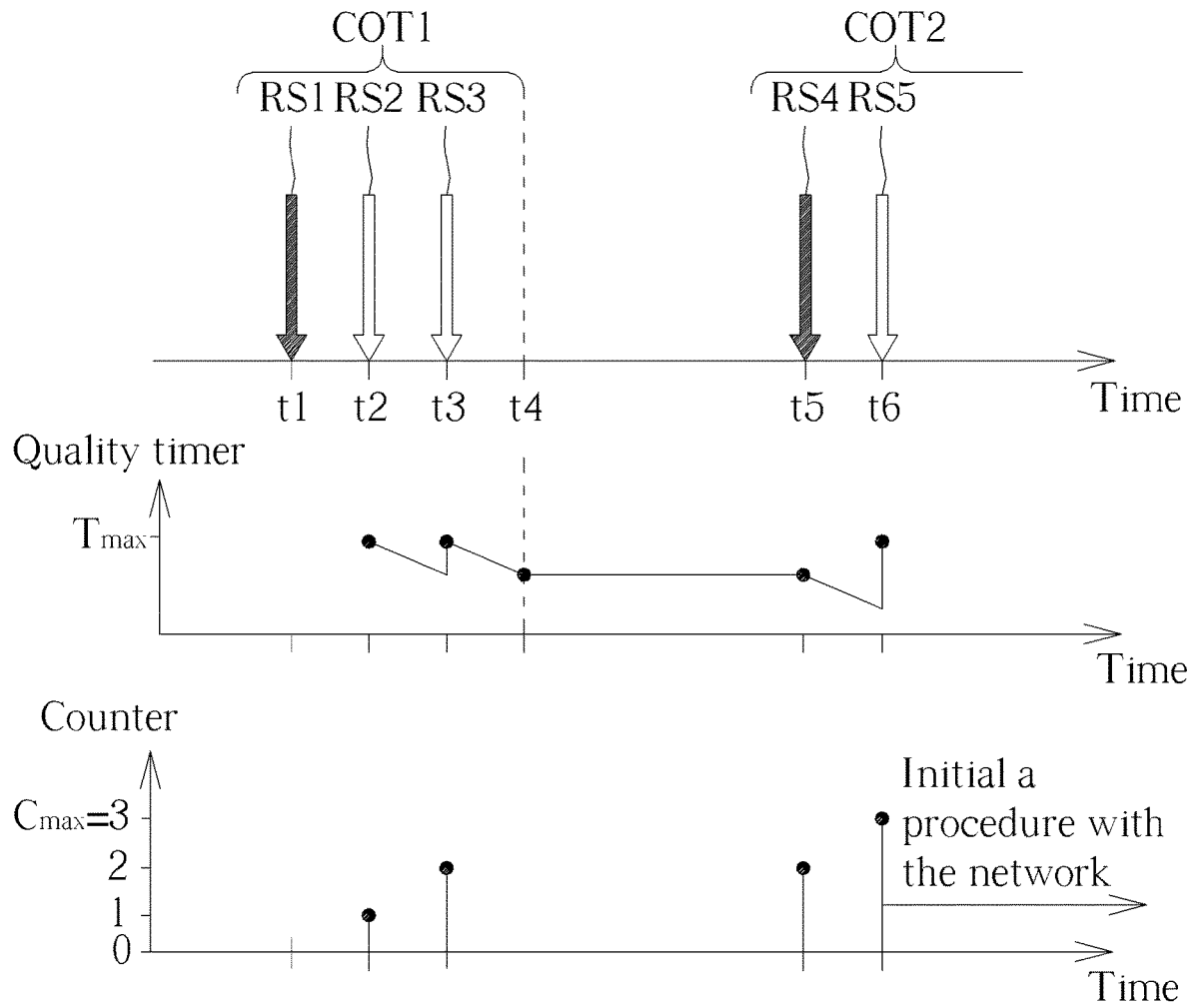
FIG. 14 is a schematic diagram of receptions of RSs according to an example of the present invention.

FIG. 14 is a schematic diagram of receptions of RSs according to an example of the present invention. A quality timer and a counter may be a BFD timer and a BFI counter, respectively, e.g., if the RSs are BFD RSs. The communication device may be configured with values $T_{max}$ and $C_{max}$ by a higher layer signal. The value $C_{max}$ is a maximum value (e.g., the threshold value) of a number of received RSs with qualities smaller than a measurement threshold value. A RS represented by a solid arrow means that a quality of the RS is greater than the measurement threshold value. A RS represented by a hollow arrow means that a quality of the RS is smaller than the measurement threshold value.

According to FIG. 14, the communication device receives RSs RS1-RS3 from the network in an unlicensed band at times instants t1-t3, respectively. At the times instants t2 and t3, the communication device restarts (e.g., starts) the quality timer, and updates the counter. The times instants t1-t3 are in a COT interval COT1. An end of the COT interval COT1 is at a time instant t4, and the communication device pauses the quality timer at the time instant t4. At a time instant t5, the communication device receives a RS RS4, restarts the quality timer. At a time instant t6, the communication device receives a RS RS5, restarts the quality timer, and updates the counter. The time instants t5 and t6 are in a COT interval COT2. That is, the communication device may initiate a procedure with the network according to the counter which is equal to the value $C_{max}$.

In one example, the communication device resumes the quality timer, when receiving the RS from the network in a second COT interval (e.g., in the unlicensed band). In one example, the communication device may initiate a procedure with the network, when the counter is greater than a threshold value, when the quality timer expires. In one example, the procedure comprises at least one of a RA procedure, a selection of a new candidate beam or a transmission of a PUCCH (e.g., a SR-like PUCCH) for a BFR.

In the above examples, a BFD RS may be replaced by a CSI-RS, a SSB, a DMRS or a SRS, but is not limited herein. The network may transmit BFD RSs periodically.

In the above examples, a DCI may notify a group of communication devices of a slot format, available RB sets, COT duration and search space set group switching, but is not limited herein.

In the above examples, a reference RS may be replaced by a TCI state, a TCI state ID, a QCL assumption, qcl-Type, QCL-Type-D or a candidate RS (e.g., a candidate RS for a spatial QCL assumption), but is not limited herein.

In the above examples, a CSI-RS may be replaced by a CSI-RS resource set index, a CSI-RS resource set, a CSI-RS resource index, CSI-RS resource, a CSI-RS port index or a CSI-RS port, but is not limited herein.

In the above examples, a SSB may be replaced by a SSB resource set index, a SSB resource set, a SSB resource index, SSB resource, a SSB port index or a SSB port, but is not limited herein.

In the above examples, a SRS may be replaced by a SRS resource set index, a SRS resource set, a SRS resource index, SRS resource, a SRS port index or a SRS port, but is not limited herein.

In the above examples, a beam may be replaced by an antenna, an antenna port, an antenna element, a group of an antenna, a group of an antenna port, a group of an antenna element, a spatial domain filter or a RS resource, but is not limited herein. For example, a beam may be represented as an antenna port, a group of antenna port or a spatial domain filter.

In the above examples, a network may be replaced by a cell, a serving cell, a transmission reception point (TRP), an unlicensed cell, an unlicensed serving cell, an unlicensed TRP, a gNB or an eNB, but is not limited herein.

In the above examples, beam detection may be replaced by a QCL assumption or a spatial domain filter, but is not limited herein. For example, a beam detection may be represented as a QCL assumption, or a spatial domain filter.

The abovementioned steps may or may not be performed in a step-by-step way. The abovementioned examples may apply for an unlicensed band, a licensed band, a non-DRX mode, a DRX mode or power saving, but are not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the present invention may be applied for an unlicensed band, a licensed band, a non-DRX mode, a DRX mode or power saving, but is not limited herein Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling RSs in an unlicensed band. Operations to be performed by the communication device and the network are defined. As a result, the problem how to process the RSs in the unlicensed band is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a reference signal (RS) in an unlicensed band, comprising:
at least one storage device; and
at least one processing circuit, coupled to the at least one storage device, wherein the at least one storage device stores instructions, and the at least one processing circuit is configured to execute the instructions of:
receiving a RS from a network in a COT interval or in a channel occupancy duration;
updating a counter, if a quality of the RS is worse than a measurement threshold value; and
restarting a RS timer, when receiving the RS.

2. The communication device of claim 1, wherein the instructions further comprise:
receiving downlink (DL) information from the network; and
receiving the RS according to the DL information.

3. The communication device of claim 2, wherein the DL information is a DL control information (DCI), and the DCI comprises channel occupancy time (COT) information.

4. The communication device of claim 1, wherein the communication device receives the RS according to a search space set.

5. The communication device of claim 1, wherein the RS is a beam failure detection (BFD) RS.

6. The communication device of claim 1, wherein the RS is a radio link monitoring (RLM) RS.

7. The communication device of claim 1, wherein the instructions further comprise:
initiating a procedure with the network, when the counter is greater than a threshold value, or when the RS timer expires.

8. The communication device of claim 7, wherein the procedure comprises at least one of a random access (RA) procedure, a selection of a new candidate beam or a transmission of a physical uplink (UL) control channel (PUCCH) for a beam failure recovery (BFR).

9. The communication device of claim 7, wherein the procedure comprises at least one of a declaration of a radio link problem or a recovery procedure of physical layer problems.

10. The communication device of claim 1, wherein the instructions further comprise:
determining a value of the RS timer according to the counter; and
restarting the RS timer according to the value, when receiving the RS.

11. The communication device of claim 1, wherein the instructions further comprise:
restarting a quality timer, if the quality of the RS is worse than the measurement threshold value; and
resetting the counter, when the quality timer expires.

12. The communication device of claim 1, wherein the quality of the RS is a measurement result of the RS.

13. A communication device for handling a reference signal (RS) in an unlicensed band, comprising:
at least one storage device; and
at least one processing circuit, coupled to the at least one storage device, wherein the at least one storage device stores instructions, and the at least one processing circuit is configured to execute the instructions of:
receiving a RS from a network;
updating a counter, if a quality of the RS is worse than a first measurement threshold value; and
initiating a procedure with the network, when the counter is greater than a threshold value;
wherein the RS and a beam failure detection (BFD) RS are associated to a same reference RS;
wherein the instructions further comprise:
receiving downlink (DL) information from the network; and
receiving the BFD RS according to the DL information;
wherein the DL information is a DL control information (DCI), and the DCI comprises channel occupancy time (COT) information.

14. The communication device of claim 13, wherein the communication device receives the BFD RS according to a search space set.

15. The communication device of claim 13, wherein the communication device receives the BFD RS in a COT interval for the BFD RS, and receives the RS in a transmission window for the RS.

16. The communication device of claim 13, wherein the communication device updates the counter, if a quality of the BFD RS is worse than a second measurement threshold value.

17. The communication device of claim 13, wherein the instructions further comprise:
restarting a first quality timer, if the quality of the RS is smaller than the first measurement threshold value;

restarting a second quality timer, if a quality of the BFD RS is worse than a second measurement threshold value; and resetting the counter, when the first quality timer and the second quality timer expire.

18. The communication device of claim 13, wherein the procedure comprises at least one of a random access (RA) procedure, a selection of a new candidate beam or a transmission of a physical uplink (UL) control channel (PUCCH) for a beam failure recovery (BFR).

19. The communication device of claim 13, wherein the RS is a discovery RS (DRS).

20. The communication device of claim 19, wherein the DRS is a channel status information reference signal (CSI-RS) or a synchronization signal/physical broadcast channel (SS/PBCH) block.

21. The communication device of claim 13, wherein the quality of the RS is a measurement result of the RS.

22. A communication device for handling a reference signal (RS) in an unlicensed band, comprising:
at least one storage device; and
at least one processing circuit, coupled to the at least one storage device, wherein the at least one storage device stores instructions, and the at least one processing circuit is configured to execute the instructions of:
restarting a quality timer and updating a counter, if the communication device receives a RS from a network in a first channel occupancy time (COT) interval and a quality of the RS is worse than a measurement threshold value; and
starting a pause timer and pausing the quality timer, after the first COT interval, or when the RS is not received after the first COT interval, or when the RS is a last RS in the first COT interval.

23. The communication device of claim 22, wherein the instructions further comprise:
stopping the pause timer, when receiving the RS from the network in a second COT interval.

24. The communication device of claim 22, wherein the instructions further comprise:
resuming the quality timer, when the pause timer expires, or when receiving the RS from the network in a second COT interval.

25. The communication device of claim 22, wherein the instructions further comprise:
initiating a procedure with the network, when the counter is greater than a threshold value, or when the quality timer expires.

26. The communication device of claim 25, wherein the procedure comprises at least one of a random access (RA) procedure, a selection of a new candidate beam or a transmission of a physical uplink (UL) control channel (PUCCH) for a beam failure recovery (BFR).

27. The communication device of claim 22, wherein the quality of the RS is a measurement result of the RS.

28. A communication device for handling a reference signal (RS) in an unlicensed band, comprising:
at least one storage device; and
at least one processing circuit, coupled to the at least one storage device, wherein the at least one storage device stores instructions, and the at least one processing circuit is configured to execute the instructions of:
restarting a quality timer and updating a counter, if the communication device receives a RS from a network in a first channel occupancy time (COT) interval and a quality of the RS is worse than a measurement threshold value; and
pausing the quality timer, after the first COT interval, or when the RS is not received after the first COT interval, or when the RS is a last RS in the first COT interval.

29. The communication device of claim 28, wherein the instructions further comprise:
resuming the quality timer, when receiving the RS from the network in a second COT interval.

30. The communication device of claim 28, wherein the instructions further comprise:
initiating a procedure with the network, when the counter is greater than a threshold value, or when the quality timer expires.

31. The communication device of claim 30, wherein the procedure comprises at least one of a random access (RA) procedure, a selection of a new candidate beam or a transmission of a physical uplink (UL) control channel (PUCCH) for a beam failure recovery (BFR).

32. The communication device of claim 28, wherein the quality of the RS is a measurement result of the RS.

* * * * *